United States Patent [19]

Spinosa et al.

[11] Patent Number: 4,747,565
[45] Date of Patent: May 31, 1988

[54] POWERED RETRACTABLE PASSENGER RESTRAINT SYSTEM

[75] Inventors: Dominic J. Spinosa, Wantagh; Frank Knoll, Huntington Station, both of N.Y.

[73] Assignee: East/West Industries, Hauppauge, N.Y.

[21] Appl. No.: 780,562

[22] Filed: Sep. 26, 1985

[51] Int. Cl.⁴ .............................................. B64D 11/06
[52] U.S. Cl. .................................................. 244/122 B
[58] Field of Search ........ 244/122 B, 122 R, 122 AG, 244/122 AH; 280/806, 807; 297/471, 472, 48; 242/107.2, 107.4 A, 107.4 B

[56] References Cited

U.S. PATENT DOCUMENTS

| | | | |
|---|---|---|---|
| 3,110,455 | 11/1963 | Oliveau | 244/122 AH |
| 3,178,136 | 4/1965 | Bayer | 244/122 AG |
| 3,219,297 | 11/1965 | Kenyon | 244/122 B |
| 3,329,273 | 3/1966 | Pitney | 244/122 AG |
| 3,329,464 | 6/1967 | Barwood et al. | 244/122 B |
| 3,386,683 | 6/1968 | Howland | 244/122 |
| 3,389,873 | 6/1968 | Filippi et al. | 242/107.2 |
| 3,522,918 | 8/1970 | Wrighton | 244/122 B |
| 3,977,724 | 8/1976 | Pitney | 297/385 |
| 4,422,669 | 12/1983 | Chiba et al. | 280/806 |

FOREIGN PATENT DOCUMENTS 1258697  3/1961  France .......................... 244/122 AG Primary Examiner—Joseph F. Peters, Jr.
Assistant Examiner—Jesûs D. Sotelo
Attorney, Agent, or Firm—Hoffman & Baron

[57] ABSTRACT

A powered retractable passenger restraint system for securing the occupant of a vehicle seat, especially a seat in a high performance aircraft, in an upright sitting position against the seat, which includes an upper body harness and a retraction apparatus connected thereto, which, upon actuation, forcibly retracts the upper body. a lower body harness and a retraction apparatus which, upon actuation, forcibly retracts the lower body into the seat, and apparatus responsive to the forces of inertia for actuating the upper body and lower body harness retraction apparatus. Furthermore, a manual apparatus is included in the restraint system for selectively actuating the upper lower body harness, as well as an override actuation apparatus for actuating the upper and lower body retraction apparatus regardless of the condition of the other actuation apparatus, so that in emergency conditions such as ejection, the passenger is retracted to the seat. In a preferred embodiment, the lower body retraction apparatus and harness can be contained in a survival kit which can serve as the lower portion of the passenger seat and which, upon separation from the aircraft, continues to operate independently.

24 Claims, 2 Drawing Sheets

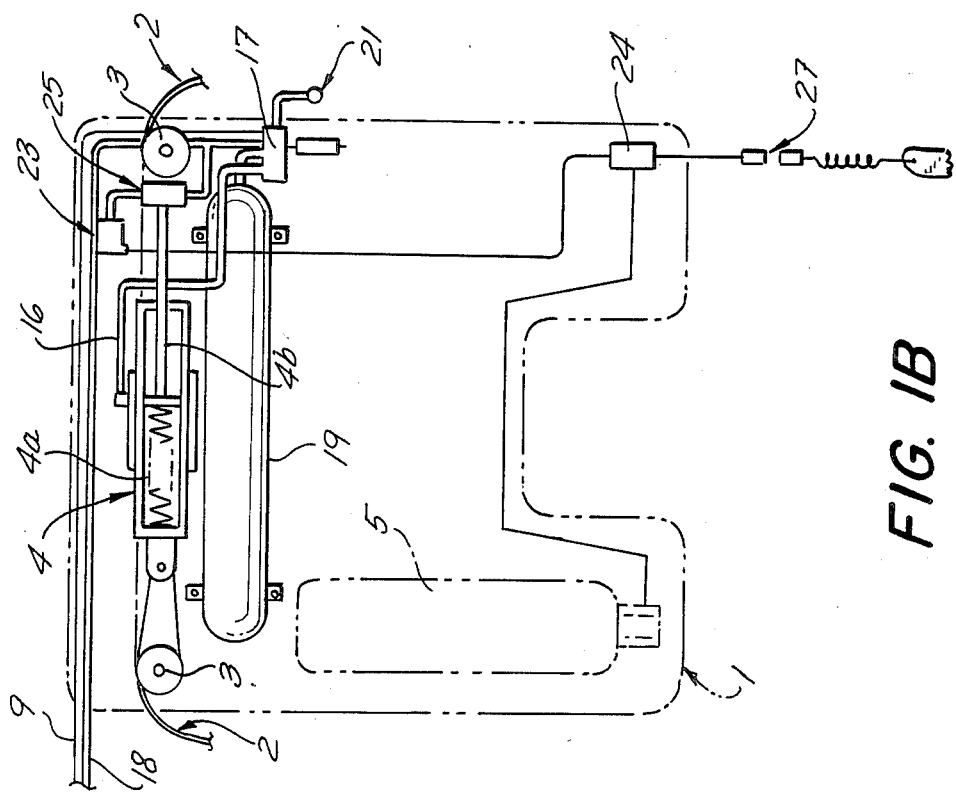
FIG. 1B
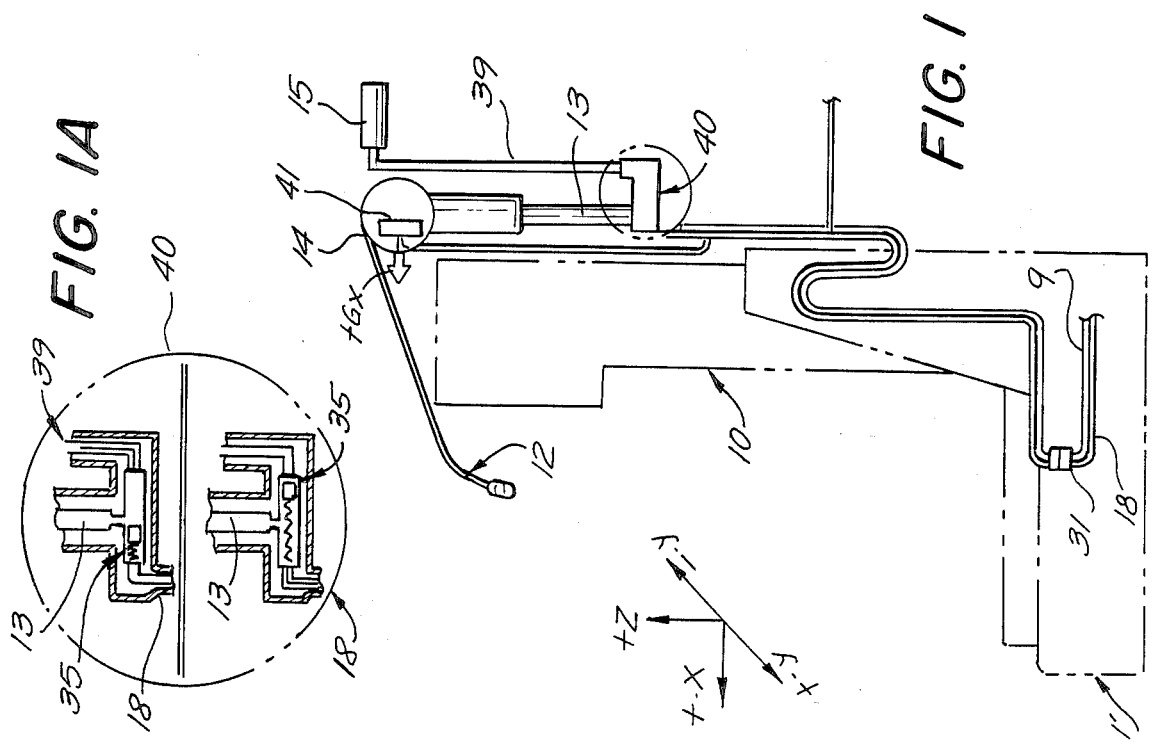
FIG. 1A
FIG. 1

POWERED RETRACTABLE PASSENGER RESTRAINT SYSTEM

BACKGROUND OF THE INVENTION

The present invention relates to the art of passenger restraint systems, and, in particular, to those system designed to maintain body position during destabilizing conditions.

It is known in the art of passenger-support systems that occupants in vehicles undergoing high performance maneuvers and/or otherwise subjected to severe velocity changes, whether it be rate of travel or change of direction or both, experience highly destabilizing forces on the body which induce movement of the body out of or about the seat. Injury, loss of orientation, loss of control of the vehicle, etc. are but a few of the effects suffered from the unsettling forces of severe velocity changes.

Passenger restraint systems known in the art usually include passenger restraint seat-belts which are pulled from one or more seat belt holders generally across the body and secured by a clip or buckle to either a cooperating seat-belt or a receiving assembly. The belts are either held at the length established by the initial pull from the holders, or are urged against the passenger to reduce slack by retractors biased in the retracting direction.

In the case of an "established-length" system, the passenger normally initially overpulls the seat belt(s) to provide room to move about relatively freely in the seat. Three are no means by which the passenger can be forcibly retracted back to the seat in case of collision or other unsettling forces.

In the case of these seat belts, which are continually urged toward retraction, the belts yield to passenger movement, except during an abrupt stop, in which case inertia sensors activate a mechanism which restrains the belt from travel. Once again, however, passenger retraction back to the seat is not provided. Consequently, restraint systems presently in use have been found somewhat inadequate under highly destabilizing conditions.

Inadequate body restraint is one of the reasons that many aircrewmen ejecting from modern day aircraft sustain injuries. Inadequate body restraint can be caused by loose lap belts and/or shoulder harness resulting from, for example, improper harness fit, loosening by occupant for comfort, immobility of the occupant, belt binding, belt slippage, interference of flight gear, and neglect of occupant.

Aircrewmen perform very complex tasks under demanding environmental conditions and must be provided with a functional, reliable, safe, and easily maintainable restraint system that maintains body stability under all operational modes, e.g., egress of ejection seats, seat-passenger separation, and in-flight inertial (G) excursions. For example, one of the problems encountred in high performance aircraft is crewman displacement associated with flight trajectory departures, such as spins, which induce high transverse force of inertia. Another unsettling force is the "eyeballs-out" G force caused by, among other things, rapid deceleration. Either of these unsettling forces can result in the inability of the crewman to obtain proper body positioning to make corrective action.

As a result of inadequate restraint, the vehicle occupant can incur severe spinal and abdominal injury, and, in the case of high performance aircraft, the occupant can suffer detrimental effects from limb flail, seat-occupant separation both in the aircraft and during ejection, as well as hazardous survival kit interface during ejection.

In the case of aircraft restraint systems, inertia reels presently available having a manual lock which allows no forward movement; an auto lock which allows upper torso mobility in and out with a certain rate of payout and a crash inertia locking feature as discussed hereinabove; and a powered retraction capability which provides ballistic powered haul-back on ejection only.

However, these operations are deficient during certain aircraft maneuvers, particularly flat spins. In a flat spin, the crewmen tend to move forward in the unrestrained harness as a consequence of the resulting "eyeballs-out" G force. The level of G force in this situation is sufficient to move the crew member forward, but not great enough to cause harness reel lock up. Should it become necessary to eject in this spin environment, eyeballs-out G forces might exceed the haul-back capability of the inertia reel resulting in crewmen who are not properly positioned or restrained for ejection and are susceptible to serious injury.

Similar problems are encountered in other high performance craft such as automobiles, boats, etc., as well as in collision conditions in almost any vehicle. An example of efforts to overcome these defects in automobile restraint systems in the instantly-inflatable balloon positioned in front of automobile passengers.

It is, therefore, an object of the present invention to provide a passenger restraint system which restrains a vehicle passenger, especially in high performance aircraft, under unsettling force conditions.

It is another object of the present invention to provide a total upper and lower passenger restraint system in combination with a survival kit system in order to minimize space requirements as well as reliance on viability of aircraft systems.

SUMMARY OF THE INVENTION

The present invention is a power retractable passenger restraint system for securing the occupant of a vehicle seat, especially in a high performance aircraft, in an upright sitting position against the seat under various unsettling or emergency conditions. The restraint system includes an upper body harness, an upper body harness retraction means connected to the upper body harness which, upon actuation, forcibly retracts the upper body of the occupant back against the seat. The system further includes a lower body harness with a lower body harness retraction means connected to the lower body harness which, also upon actuation, forcibly retracts the lower body into the seat. The system also includes a means responsive to forces of inertia for actuating the lower body harness retraction means and the upper body retraction means, this inertial force means connected for actuation to each of the retraction means. There is also included a manual means for selectively actuating the lower body harness retraction means and the upper body harness retraction means which is connected for actuation to each of the retraction means.

A further feature of the present invention is an override actuation means for actuating the upper body harness and the lower body harness regardless of the condition of the other actuating means which is connected for actuation to each of the retraction means and which is responsive to emergency remedy conditions such as passenger/seat separation from the vehicle.

A preferred embodiment of the invention contemplates that the upper body harness retraction means include a pneumatic-powered harness reel in fluid communication with a source of pressurized pneumatic fluid which is connected for actuation to each of the actuating means upon receipt of an actuating signal. The lower body harness, on the other hand, includes a pneumatic operated cylinder-piston device in fluid communication with a source of pressurized fluid which is connected for actuation to the different actuating means upon receipt of the actuating signal.

Referring to the separate actuating means, the inertial force actuating means can include an inertial force sensor which responds to a force of at least about $\frac{1}{2}$ G. (that is $\frac{1}{2}$ the force of gravity) in each of the $+x$, $\pm y$, and $+z$ directions by transmitting an actuating signal to the different retraction means. The inertial force sensor can also be adjusted by the vehicle occupant in one embodiment of the invention so that the occupant can vary the magnitude of force required to transmit an actuating signal to the retraction means.

The manual means for actuating can include a lever fixed for access by the seat occupant and can be moved to actuate the upper body and lower body harness retraction means. Finally, the override actuation means can include an electrical signal transmitting device connected for actuation by the seat occupant to the upper body harness retraction means and a vehicle disconnect means which transmits an actuating signal to the lower body harness means upon seat/occupant separation from the vehicle.

In one of the most preferred embodiments of the present invention, the lower body harness and the lower body harness retraction means can be housed in the bottom portion of the vehicle seat, which, in the case of a high performance aircraft, can be a survival kit, and the harness and lower body harness retraction means can be made to be operative independent of the operating systems of the aircraft. This is especially important in high performance aircraft, since space is at a premium in the pilot and/or passenger seating area, and since the operating systems of a disabled aircraft cannot always be relied upon to provide the necessary support for a powered restraint system.

Further in this regard, the present invention also contemplates a combination powered passenger restraint system and survival kit for use in combination with passenger restraint belts which includes a powered retraction means mounted in a survival kit and connected to the passenger restraint belts for retraction in response to actuation. Also included is an acutation means mounted in the survival kit and connected to the powered retraction means for actuating it whereby the passenger restraint belts are retracted. The powered retraction means can include a hydraulically driven piston in a cylinder attached to the belts for retraction of the belts on driving the piston to the limit of its power stroke, and a source of pressurized hydraulic fluid connected to the actuation means and in fluid communication with the cylinder in the actuated condition for driving the piston through its power stroke so that the restraint belts are retracted in response to the actuation means.

The actuation means, in a preferred embodiment, can include manual actuating means fixed for access by the occupant and emergency actuating means mounted for actuation in response to emergency conditions, such as seat/occupant separation from the vehicle. The actuation means can further include a mode select means connected to the manual actuating means and to the emergency actuating means for actuating the powered retraction means in response to emergency actuation.

Other emergency conditions which can give rise to actuation include unsettling inertial forces in which case the emergency actuating means includes an inertial force sensor which detects inertial forces in the $+x$, $\pm y$ and $+z$ directions and actuates the powered retraction means upon detection of an inertial force of at least 3 G in any one of these directions.

In the case of a seat/occupant vehicle separation, the actuation means can be a vehicle disconnect which actuates the powered retraction means upon disconnection of the survival kit/occupant from the vehicle. Preferably, the source of pressurized hydraulic fluid can be a gas pressure reservoir for charging gas up to about 1000 psi and also preferably includes a hydraulic feed line connected to the cylinder for charging the cylinder with pressurized gas.

Other features which preferably can be included in the present invention for purposes of occupant comfort include a release means on the cylinder to relieve gas pressure from the cylinder after the piston has been driven to its retracted position. This release means can include a vent orifice dimensioned to permit gas exit at a rate by which the occupant is continuously restrained from about 2 to about 30 seconds. Alternatively, the release means can be a manual release valve connected to the cylinder for discharging gas upon manual actuation.

As previously indicated, this combination can be housed in a survival kit which can function as an aircraft passenger seat in which at least one source of pressurized oxygen is mounted for attachment to an oxygen supply system for the occupant. In this instance, a further desirable feature would be that the source of pressurized oxygen include an actuation means which releases pressurized oxygen to the supply system upon separation of the survival kit/occupant from the vehicle.

As a result of this new and unique powered restraint passenger system, a seat/occupant, such as an aircrewman, an be pulled back into a seat to minimize, or eliminate, undesirable, unsettling conditions such as those incurred during high performance flight.

Furthermore, the problems incurred during ejection such as dynamic overshoot during ejection catapult power stroke and limb flail can be minimized or even eliminated.

Other benefits realized as a result of the present invention include a compact, efficient restraint system resulting from the ability to include a portion of it in a survival kit which operates independently of the aircraft operating systems.

For a better understanding of the present invention, together with other and further objects, reference is made to the following description taken in conjunction with the accompanying drawings, and its scope will be carried out in the appended claims.

BRIEF DESCRIPTION OF THE DRAWINGS

Preferred embodiments of the invention have been chosen for purposes of illustration and description and are shown in the accompanying drawings, wherein:

FIG. 1 is a schematic of a side elevational view of a seat employing the restraint system of the present inventin;

FIG. 1A is a side elvation of a detail shown in FIG. 1 showing an upper body harness override feature of one embodiment of the present invention;

DETAILED DESCRIPTION OF THE INVENTION

Figure 2:
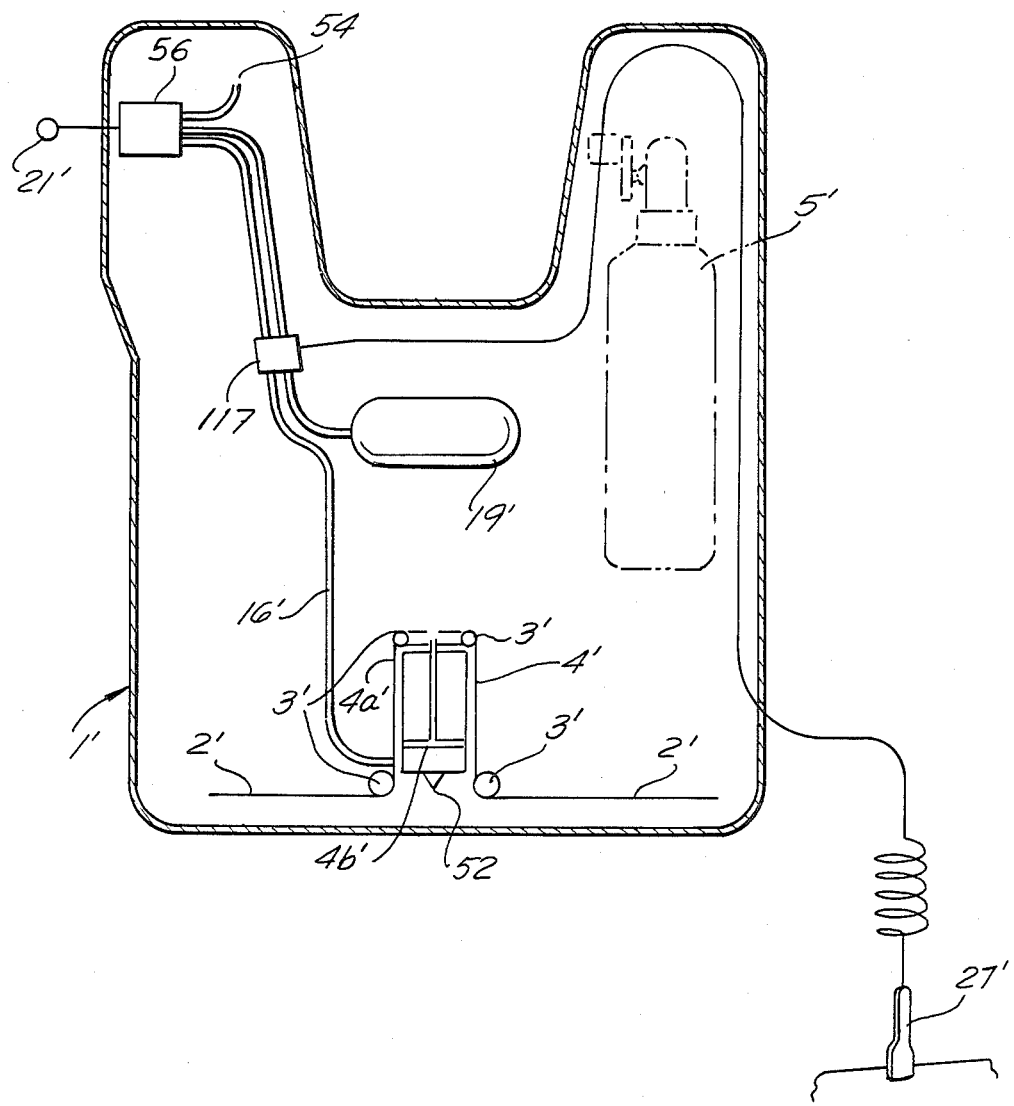
FIG. 2 is a schematic of a combination seat survival kit in accordance with the present invention.

Referring to the drawings, there is depicted an aircraft seat having an upright portion 10 and a bottom portion 1 (shown in phantom in FIG. 1). The schematic of FIG. 1 shows a side elevation schematic of the seat as it is connected to the present system. FIG. 1B shows a plan view in schematic of the seat portion. Features of the present invention shown in FIG. 2 which are the same or similar as parts shown in FIG. 1 have the same number, but are distinguished with a prime, i.e., 2 in FIG. 1 and 2' in FIG. 2. In the side elevation view, there can be seen an upper body shoulder harness 12 which is fixed to the back portion of the seat 10 while lower body harness lap belts used in the present system are represented by seat belt cables 2, 2'. The pneumatic-powered inertia reel 14 is known in the art of passenger restraint systems, and is not described in detail herein since it is not in and of itself an inventive feature, except as it interfaces with the pneumatic power supply, et al., which shall be discussed below.

The inertia reel 14 can be powered by a pneumatic fluid, such as gas (especially nitrogen) via valve means 40, shown in detail at FIG. 1A. During non-emergency conditions, the shuttle valve 35, permits passage of hydraulic fluid, via conduit 18 into the powered inertia reel mechanism, conduit 13 (see the lower half of detail in FIG. 1A). In this mode, the inertia reel will operate responsive to the inertia force sensing mechanism and in response to manual actuated retraction means. In emergency conditions, such as ejection, the ballistic device 15 can be fired electronically by an occupant actuation means, which forces orverride pneumatic fluid through conduit 39, thereby forcing the shuttle valve forward in the valve means 40 and permitting actuation of the inertia reel immediately by introduction of fluid through conduit 13 (see the upper portion of detail of FIG. 1A). Since such electrical firing mechanisms are well known in the art, the system has not been shown in the present drawings.

Referring to the lower harness restraint system, there can be seen a seat belt retraction assembly located in the lower portion 1, 1' of the occupant seat. In particular, the retraction means can include a cylinder piston device 4, 4' including cylinder 4a, 4a' and piston 4b, 4b' connected to lower body retraction cables 2, 2' through haulback reels 3, 3'. When the piston 4b, 4b' is driven to the limit of its power stroke by hydraulic fluid supplied to the pneumatic cylinder piston assembly 4, 4' through line 16, 16', the cables are retracted, thus pulling the lower body restraint belts. The pneumatic fluid used to power the cylinder piston assembly 4, 4' can be contained in a reservoir 19, 19', which in the preferred embodiment can be charged as needed after expenditure of fluids, such as nitrogen gas.

Continuing with regard to the present invention there can be seen in the left hand side in FIG. 1 an inertial force sensing mechanism 41 capable of detecting inertial forces which operate to unseat the occupant. In the present drawings, the arrow indicates the $+G_x$ force, but the present invention also includes the use of force sensing devices which can detect $+G_y$ unsettling forces as well as $+G_z$ forces. (Since the seat restrains the occupant against $-G_x$ and $-G_z$, there would be no need for a sensing device which detect these types of inertial forces). The inertia force sensing mechanism 41 is designed to send an electrical signal upon sensing a G force, shown in the drawings in the "eyeballs-out," or forward, direction of a magnitude which would tend to unseat the occupant under less than crash conditions, e.g., at least about ½ G. The occupant can also experience unsettling inertial forces in both the left and right, i.e., $\pm G_y$ forces, such as when the vehicle is in a spin or yaw, and, accordingly, it is contemplated that an electrical signal would also be sent when such force reached a magnitude of at least about ½ G. Finally, the occupant could also experience an unseating force in the $+z$ direction or upward direction such that an inertial force sensor should be able to detect and send a signal when such force would reach a magnitude of ½ G. Thus, such a sensing mechanism would generate an electrical signal under those conditions in which aircrewmen would be unseated in extreme maneuver conditions. It should be noted that in a further preferred embodiment the magnitude of the inertial force sensors can be adjusted to various triggering magnitudes depending on aircraft mission(s) and/or conditions.

The inertial force sensing mechanism 41 is connected by electrical line 9 (which can be conveniently included in the vehicle electrical system as shown in the drawings) directly to a fluid control actuator 17. Upon receiving an electrical signal along electrical line 9, the fluid control actuator 17 allows passage of pressurized hyrdualic fluid from reservoir 19 into hydrualic fluid conduits 18 and 16, whereby both the upper harness inertial reel 14 as well as the lower harness piston-cylinder device 4 are actuated to retract the passenger back into the seat in the presence of unsettling G forces. Conduit 18 is preferably flexible in order to allow relative movement between the upright seat back 10 and the seat 1.

Another means for actuating the upper and lower harness is by manual actuation by use of repeatable manual actuation handle 21 which, in FIG. 1, is connected to fluid control actuator 17, and, in FIG. 2, is connected by way of manual control valve 56 to fluid control actuator 117. Upon manual actuation pressurized hydraulic fluid stored in reservoir 19, 19' is allowed to pass into conduits 16, 16' and 18 in order to actuate the respective retraction means. With regard to the lower harness restraint system in FIG. 2, the actuated piston 4, 4' can slowly be released through constant release valve 52, which can be a gas exit orifice having a dimension which permits measured passage of gas while restraining the passenger for from about 2 to about 30 seconds. Alternatively, the pressurized gas in the cylinder 4a' can be released by a manual release means indicated at 54, which is operated by manual control valve 56. Relative to the embodiment shown in FIG. 1, the manual actuation handle 21 itself can include in combination with the fluid control actuator 17 a gas pressure release position which releases the force of the pressurized gas in each of the of cylinders 4a, 4a' in the retracting means so that the seat occupant is once again allowed to move freely within the seat belt and shoulder harness (not shown herein).

The third actuation means contemplated for use in the present invention for forcibly retracting the shoulder harness and lower body harness, is an override actuation means which can include, in the embodiment shown in FIG. 1, a ballistic force device 23 connected to an electrical switch for operation by the seat occupant as described above. This feature will of course operate to retract the pilot at time zero in an ejection cycle since the electric switch will be attached to the ejction switch means. Usually the ejection switch and, consequently, the ballistic firing switch are combined in some manner with the arms of the seat so that when the pilot lifts the arms, the ballistic device 23 is fired, thereby actuating the haulback inertia reel 14 through valve means 40 and conduit 13.

The override means can also include a vehicle disconnect device 27 associated with the lower harness restraint shown in FIG. 1, which is attached to signal sensing device 24. The signal sensor 24 sends a firing signal to a ballistic device 23 when the lower harness portion separates from the vehicle. When the ballistic device 23 fires, hydraulic fluid is forced through fluid control actuator 17 to actuate the cylinder-piston assembly 4. Normally, in the case of ejection, the upper seat harness ballistic device has already been fired at time zero, whereas the lower vehicle disconnct firing system will be fired at some time during the separation sequence. Refering to FIG. 2, vehicle disconect means 27' is shown directly attached to shuttle valve 117 for release of hydraulic fluid from reservoir 19' upon disconnection from the vehicle.

In the case of an ejection seat for an aircraft, there can also be provided a high pressure breakaway valve and electrical disconnect mechanism 31 which allows the seat with the accompanying restraint system to maintain the restraint system in the retracted position in the absence of the aircraft support systems.

In a preferred embodiment, when the lower body harness restraint system is part of a survival kit, oxygen tank 5, 5' can be mounted in the kit, and even mounted for actuation to the vehicle means 27, 27' (as shown in FIG. 1 and FIG. 2). In this way, the passenger is automatically provided with pressurized oxygen when the seat/occupant is separated from the vehicle.

Thus, while there have been described what are presently believed to be the preferred embodiments of the present invention, those skilled in the art will realize that changes and modifications may be made thereto without departing from the spirit of the invention, and it is intended to claim all such changes and modifications as fall within the true scope of the invention.

What is claimed is:

1. A powered retractable passenger restraint system for securing the occupant of a seat of a vehicle in an upright sitting position against said seat, comprising:
    an upper body harness;
    an upper harness retraction means connected to said upper body harness which, upon actuation, forcibly retracts said upper body harness,
    a lower body harness,
    a lower body harness retraction means connected to said lower body harness which, upon actuation, forcibly retracts said lower harness,
    means responsive to forces of inertia for actuating said lower body harness retraction means and said upper body harness retraction means connected for actuation to each of said retraction means,
    manual means for selectively actuating said lower body harness retraction means and said upper body harness retraction means connected for actuation to each of said retraction means, and
    override actuation means for actuating said upper body harness retraction means and said lower body harness retraction means regardless of the condition of said other actuating means, said override actuation means connected for actuation to each of said retraction means and responsive to emergency remedy condition.

2. The powered restraint system of claim 1, wherein said upper harness retraction means comprises
    a pneumatic-powered harness reel in fluid communication with a source of pressurized pneumatic fluid which is connected for actuation to each said inertial actuation means, said manual actuating means, and said override actuating means upon receipt of an actuating signal.

3. The powered restraint system of claim 1, wherein said lower body harness retraction means comprises
    a pneumatic operated cylinder-piston device in fluid communication with a source of pressurized fluid which is connected for actuation to each said inertial actuating means, said manual actuating means, and said override actuating means upon receipt of an actuating signal.

4. The powered restraint system of claim 1 wherein said inertial force actuating means comprises an inertial force sensor which responds to a force of at least about $\frac{1}{2}$ G in each of the $+x$, $\pm y$, and $+z$ directions by transmitting an actuating signal to said upper body harness retraction means and said lower body harness retraction means.

5. The powered restraint system of claim 4 wherein said inertial force sensor is adjustable by said occupant to transmit said signal in response to different magnitudes of inertial force.

6. The powered restraint system of claim 1 wherein said manual means for actuating comprises a lever fixed for access by said occupant which can be moved to actuate each said upper body harness retraction means and said lower body harness retraction means.

7. The powered restraint system of claim 1 wherein said override actuation means comprises
    an electrical signal transmitting device connected for actuation by said occupant to said upper body harness retraction means; and
    a vehicle disconnect means which transmits an actuating signal to said lower body harness retraction means upon seat/occupant separation from said vehicle.

8. The powered restraint system of claim 1 wherein said lower body harness and said lower body harness retraction means are housed in the bottom portion of said vehicle seat.

9. The powered restraint system of claim 8 wherein said vehicle is a high performance aircraft and said bottom portion of said seat is a survival kit, said lower body harness and lower body harness retraction means being operative independent of operating systems of said aircraft.

10. A combination powered passenger restraint system and survival kit for use in combination with a passenger restraint belts including an upper body harness and a lower body harness, which comprises:

powered retraction means mounted in said survival kit and connected to said passenger restraint belts for retraction in response to actuation, and actuation means mounted in said survival kit and connected to said powered retraction means for actuating said retraction means, said actuating means including means responsive to forces of inertia for actuating said lower body harness and said upper body harness, manual means for selectively actuating said lower body harness and said upper body harness, and override actuation means for actuating said upper body harness and said lower body harness regardless of the condition of said other actuation means, said override actuation means responsive to emergency remedy condition, whereby said passenger restraint belts are retracted.

11. The combination of claim 10 wherein said powered retraction means comprises a hydraulically-driven piston in a cylinder attached to said belts for retraction of said belts upon driving said piston to the limit of said piston's power stroke, and a source of pressurized hydraulic fluid connected with said actuation means and in fluid communication with said cylinder in the actuated condition for driving said piston through said power stroke, whereby said restraint belts are retracted in response to said actuation means.

12. The combination of claim 11 wherein said source of pressurized hydraulic fluid is a gas pressure reservoir for charging with gas up to about 1000 psi.

13. The combination of claim 12 wherein said source further comprises a hydraulic feed line connected to said gas pressure reservoir for charging said cylinder with pressurized gas.

14. The combination of claim 11 which further comprises a release means on said cylinder to relieve fluid pressure from said cylindner after said piston has been driven to its retracted position.

15. The combination of claim 14 wherein said release means comprises a vent orifice dimensioned to permit fluid exit at a rate by which said occupant is continuously restrained from about 2 to about 30 seconds.

16. The combination of claim 14 wherein said release means comprises a manual release valve connected to said cylinder for discharging said fluid therefrom upon manual actuation.

17. The combination of claim 10 wherein said emergency remedy condition comprises passenger/survival kit separation from said vehicle.

18. The combination of claim 17 wherein said means responsive to forces of inertia includes an inertial force sensor which detects inertial forces in the $+x$, $\pm y$, and $+z$ directions, and actuates said powered retraction means upon detection of at least about $\frac{1}{2}$ G inertial force in one of said directions.

19. The combination of claim 18 wherein said inertial force sensor is adjustable by said occupant to actuate said powered retraction means upon detection of different magnitudes of inertial force.

20. The combination of claim 17 wherein said override actuation means comprises a vehicle disconnect which actuates said powered retraction means upon disconnection of said survival kit/occupant from said vehicle.

21. The combination of claim 10 which further comprises survival kit housing which can function as an aircraft passenger seat, and at least one pressurized oxygen rservoir is mounted thereon for attachment to an oxygen-supply system for said occupant.

22. The combination of claim 21 wherein said source of pressurized oxygen includes an actuation means which releases said pressurized oxygen to said oxygen supply system upon separation of said kit/occupant from said vehicle.

23. The combination of claim 10, wherein said powered retraction means includes
an upper body harness retraction means and
a lower body harness retraction means.

24. The combination of claim 10, wherein said passenger restraint belts are those of a high performance aircraft having a plurality of operating systems, and
wherein said powered retraction means and said actuation means are operative independent of said plurality of operating systems.

* * * * *